(12) United States Patent
Wilson

(10) Patent No.: US 6,697,815 B1
(45) Date of Patent: *Feb. 24, 2004

(54) METHOD AND APPARATUS FOR APPLICATION PROGRAM SPECIFICATION AND RUN TIME EXECUTION PROVIDING FOR THE SEPARATION OF BUSINESS APPLICATION PROGRAMMING AND USER INTERFACE PROGRAMMING

(75) Inventor: Timothy Wilson, Chapel Hill, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,605

(22) Filed: Dec. 29, 1999

(51) Int. Cl.[7] .............................................. G06F 17/03
(52) U.S. Cl. ..................................................... 707/102
(58) Field of Search ................................ 709/220, 203; 712/20, 13, 203; 345/426, 417; 707/102

(56) References Cited

U.S. PATENT DOCUMENTS

| | | | |
|---|---|---|---|
| 5,410,524 A | * 4/1995 | Takeya | 369/53.37 |
| 5,583,761 A | 12/1996 | Chou | 395/798 |
| 5,758,062 A | 5/1998 | McMahon et al. | 395/183.14 |
| 5,794,250 A | * 8/1998 | Carino, Jr. et al. | 707/9 |
| 5,822,580 A | * 10/1998 | Leung | 707/103 R |
| 6,006,230 A | * 12/1999 | Ludwig et al. | 707/10 |
| 6,269,373 B1 | * 7/2001 | Apte et al. | 707/10 |
| 6,502,104 B2 | * 12/2002 | Fung et al. | 707/103 R |

FOREIGN PATENT DOCUMENTS

| | | | | |
|---|---|---|---|---|
| WO | 0067176 | 11/2000 | | G06F/17/60 |

OTHER PUBLICATIONS

IBM Technical Disclosure Bulletin, "Custom Data Entry Form System for Software Applications" by D.G. Berry and C.W. Cross, vol. 34, No. 11, Apr. 1992.

* cited by examiner

Primary Examiner—Safet Metjahic
Assistant Examiner—Sana Al-Hashemi
(74) Attorney, Agent, or Firm—Synnestvedt & Lechner LLP; Gregory M. Doudnikoff

(57) ABSTRACT

A method and apparatus for conducting business via the worldwide Web in which business programming is isolated from Web user interface programming. In accordance with the invention, a gateway servlet interfaces between a consumer's browser's software and a e-business retailer's back-end business software running, for instance, on a separate mainframe. The gateway servlet receives input information from the consumer and forwards it to the back-end software for business processing. The back-end software returns a user interface record object to the gateway which then instantiates a Java bean and invokes a Java Server Page in order to generate a HTML page to be returned to the user based on the user input information and the business back-end processing thereof.

35 Claims, 2 Drawing Sheets

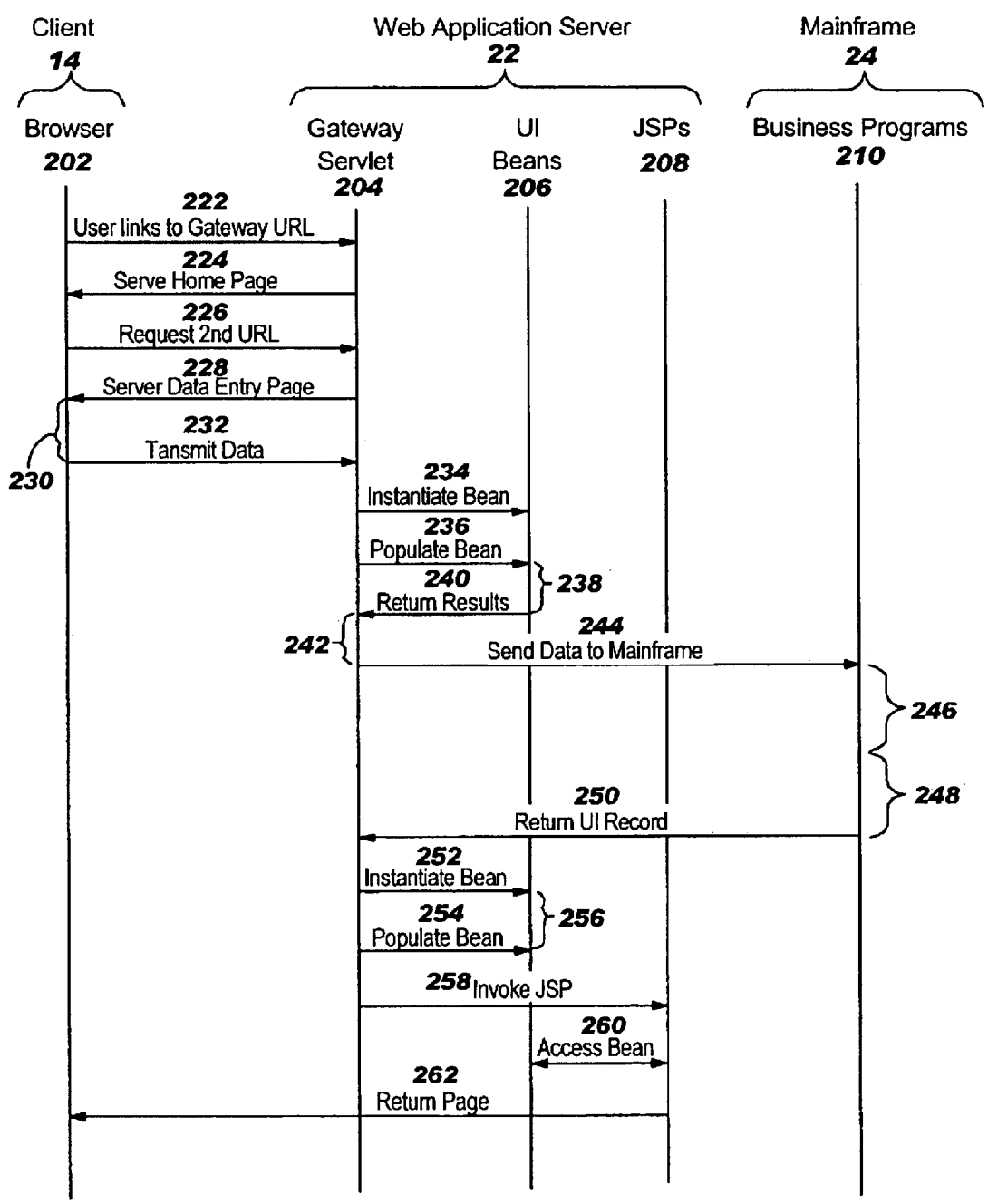

METHOD AND APPARATUS FOR APPLICATION PROGRAM SPECIFICATION AND RUN TIME EXECUTION PROVIDING FOR THE SEPARATION OF BUSINESS APPLICATION PROGRAMMING AND USER INTERFACE PROGRAMMING

FIELD OF THE INVENTION

The invention relates to software application development and run time environments. More particularly, the invention pertains to World Wide Web application development and run time environments.

BACKGROUND OF THE INVENTION

The recent explosion in use of the World Wide Web (hereinafter the Web) has created a increased need for Web application software developers. One of the largest growth areas in the Web and Web application software development has been in the transaction of business over the Internet, including both retailer to consumer transactions and business to business transactions. For instance, many traditional businesses have added an Internet site to their stable of retail outlets through which consumers can purchase goods. In addition, many new businesses have "opened up" on the Web that have no traditional, physical, retail outlets, but transact business solely (or at least primarily) over the Web. Examples of such Web business sites include Amazon.com which sells primarily books and other entertainment media, CDNow.com which sells primarily compact discs, and Etoys.com which sells primarily children's toys.

The transaction of business via the Web is commonly referred to as e-business. In a typical e-business, a company maintains and operates a Web site that can be accessed by potential consumers using Web browser software such as Netscape Navigator or Microsoft Explorer. A user accesses a retailers' Web site in the normal fashion, such as by clicking on a hyperlink from another Web site (e.g., a search engine results page) or typing in that Web site's URL (Universal Resource Locator) into the appropriate field on a screen display provided by the browser software. The Web host server on which the requested Web page resides returns a Web page to the user's computer (herein termed client machine) which then displays the selected Web page on the user's monitor.

For exemplary purposes, let us assume that a user accesses a home page of an e-business retailer that sells compact discs. The home page typically will contain graphics, text and various hyperlinks to other Web pages, including at least one page that can be used for entering an order for one or more compact discs. When the user clicks on that particular hyperlink, it causes the browser software to send a request over the network to the relevant Web server for that page. The Web server returns that page to the client machine for display on the consumer's monitor. The page would typically include a plurality of questions and fields in which the consumer is to fill in information in answer to those questions, such as name, address, telephone number, credit card number, the artist and title of the desired compact disc, etc.

After the user has entered all of the required information, he will click on a button on the screen which causes the data which he just entered to be sent back to the Web server. This data essentially is a purchase order for a compact disc. At this point, the e-business retailer must process the purchase order, for the most part, in the manner that it would process any purchase order regardless of the medium through which it was received, (via the internet, via mail order, or via a consumer walking up to a cash register in a physical retail outlet). Such processing typically would include at least (1) confirmation of the credit card number and availability of enough credit to cover the purchase price of the item, (2) confirmation with an inventory database that the ordered compact disc exists and is in stock, (3) entry of all of the information in appropriate databases for purposes of tracking stock for tax and business purposes, and (4) notification of appropriate personnel in the order processing and shipping departments so that the purchase order can be physically processed to mail the compact disc to the consumer.

The software for generating and displaying the Web pages and interacting with the consumer, i.e., user interface software, may generally be termed Web software, while the software for carrying out the business transaction may generally be termed business software.

It can be seen from this example that software development for an e-business application requires knowledge of both business software development and Web software development. Historically, however, business software developers and Web software developers have worked in separate realms. That is, most business software developers know little about Web software development while Web software developers know little about business software development. As one example, business software developers typically develop software using languages such as COBOL or C++, whereas Internet software developers commonly use the HTML (Hypertext Markup Language) and Java programming languages.

In addition, a company that, prior to commencing retailing over the Web, had transacted business in more traditional fashions, such as, through physical retail outlets or mail order, usually will already have a completely developed, reliable, and familiar business software package. In order to transact business vial the Web such a company typically would need to develop an entirely new software package based on HTML in order to transact e-business. Accordingly, both companies that conduct strictly e-business as well as traditional companies that are expanding into e-business must employ Web software developers to develop the software for transacting their business over the Web. Such developers commonly have little knowledge of the business aspects of the necessary software. Accordingly, companies either must employ both business software developers who typically know little about Web software development as well as Web software developers who know little about business software development or employ either type of developer and expend significant effort in training the developer in the field in which he or she is not familiar. In either event, there are significant inefficiencies in the software development.

There are numerous available mechanisms by which the business software portion may interact with the Web software portion of an e-business. For instance, many e-business developers utilize CGIs (Common Gateway Interfaces) that interface between the web-browser and a business application program. A CGI is a program which passes a Web user's request to an application program and receives data back from the application program for forwarding to the user. When a user fills out a form such as to order a compact disc it is more than a request for a page to be returned. Specifically, the data entered by the user must be processed by a business application program before the company's Web server can return to the user's browser a customized response, e.g., the requested compact disc is in stock, it will be shipped by a certain date, and the user's credit card will be charged a certain amount. With a CGI type system, the Web server passes the information entered by the user to a small business application program running on the Web server which then processes the data and sends back to the CGI a Web page containing a confirmation message.

The software for passing data back and forth between the server and the business application program is called a Common Gateway Interface or CGI and is part of the Web's Hypertext Transfer Protocol (HTTP). A CGI provides a consistent way for data to be passed from the user's request to the business application program and back to the user. Since the interface is consistent, a programmer can write the business application in a number of different languages The most common language for CGI applications are C, C++, Java and Perl. The business application program is a regular program that understands HTML and, upon receipt of the information entered by the user, builds an HTML page to send back to the user. Thus, a business application program when used with a CGI type interface performs a combination of business processing as well as building the Web page to be sent back to the user's browser.

Another common scheme for e-business applications is to use Java servlets that run on the Web server. The Java servlet replaces the CGI and runs directly on the Web server. With a Java virtual machine running in the server, e-business application programs can be implemented on the server using the Java program language. The advantage of a Java servlet running on a server over CGI, for example, is that they can execute more quickly than CGI applications. Specifically, rather than causing a separate program process to be created, each user request is invoked as a thread in a single deamon process, meaning that the amount of system overhead for each request is small. However, the Java servlet performs both business processing and building of Web pages.

Another well known method is the use of ASPs (Active Server Pages). An Active Server Page is a HTML page that includes one or more scripts that are processed on a Microsoft Web server before the page is sent to the user. It is similar to a Java servlet as discussed above in that all involved programs run on the server. The script in the Web page at the server uses the input data received as a result of the user's request for the page to access data from a database and builds or customizes the page on the fly before sending it to the user's browser. Again, however, the ASP performs both business processing and Web page building.

In all of the above scenarios, a software development team having knowledge of Web programming, Java, HTML, HTTP, etc., as well as business software development is needed. Further, a company's existing business software may be completely useless for e-business.

Accordingly, it is an object of the present invention to provide a run time environment method and apparatus and framework for e-business software applications that provides significant separation of business software development from Web software development.

SUMMARY OF THE INVENTION

The invention is a new method and apparatus for application program specification and run time execution that separates business software development from Web software development. In accordance with the invention, a simple gateway servlet program running on a Web server interfaces between the user's browser, a back-end computer which performs all of the business data processing, one or more Java beans, and one or more Java Server Pages (JSPs). When a user enters information into a page and sends it back to the Web server, this gateway servlet receives the information and sends it to a back-end computer along with information telling the back-end computer what business program (or programs) to invoke to process that data. The back-end computer then runs the program using the input data provided to it by the gateway servlet. When the program has finished running and the desired business information has been generated, the back end computer populates a User Interface (UI) record. The back-end computer sends the UI record data to the gateway servlet.

The gateway servlet then instantiates a Java bean that has been designed for that particular data-set/object, and sets the data of that UI record into the bean. The gateway servlet then invokes a Java Server Page (JSP) also resident at the application server that has been developed to operate with that bean. The JSP generates a HTML page using the information in the aforementioned bean to customize the page in accordance with the user's original input information as processed by the business software of the back-end and then returns that page to the user's browser for display at the user's machine.

In this manner, the Web-based user-interface processing is entirely separated from the business processing. The interaction between the business processing and the user interface processing is through a very simple gateway servlet. Thus, a Web developer can develop the user interface (i.e., the HTML pages and how they relate to one another) essentially without the need to have any knowledge of the business software that generated the business data and the business software developer can develop all of the business processing software essentially independently of the Web software developer. The present invention also allows programs that have been written in typical business application programming languages such as COBOL and that run on typical business software systems such as mainframes to drive Web applications.

BRIEF DESCRIPTION OF THE DRAWINGS

FIG. 2 is a flow diagram illustrating the flow of processing in accordance with a preferred embodiment of the present invention.

DETAILED DESCRIPTION OF THE INVENTION

Figure 1:
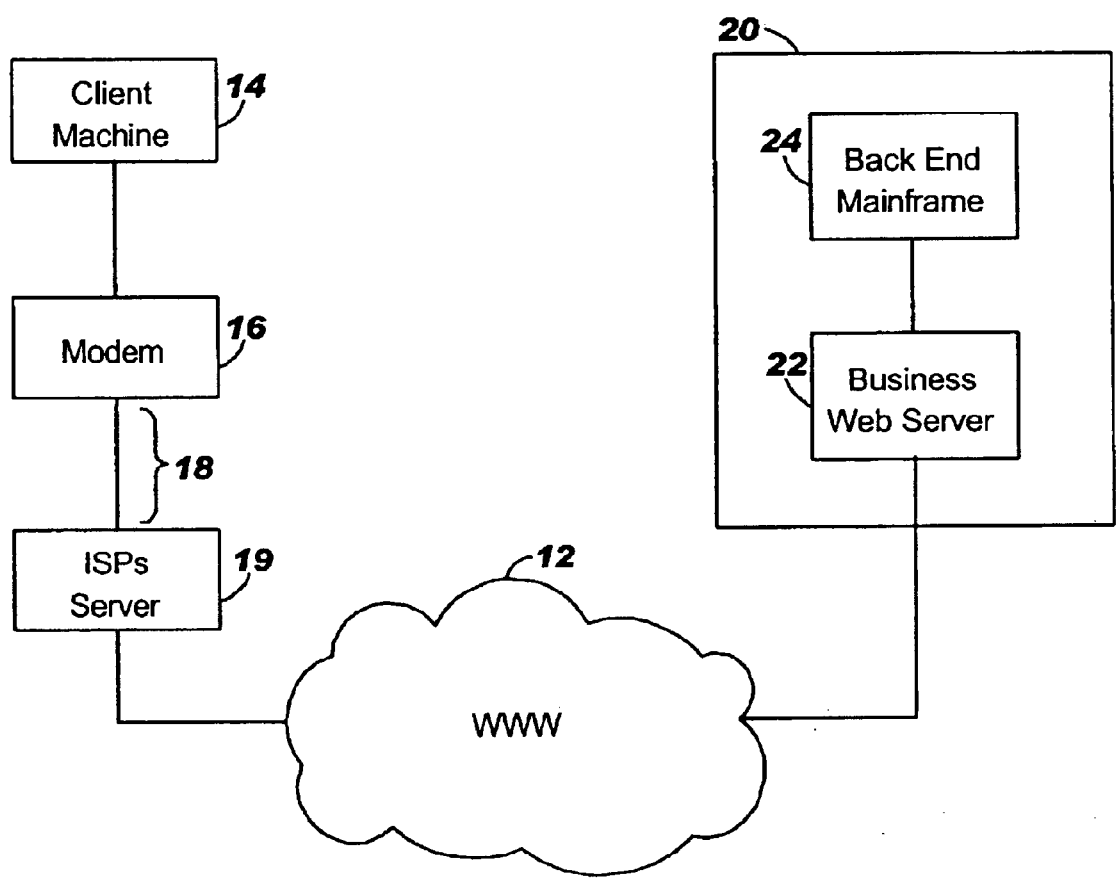
FIG. 1 is a block diagram illustrating the relevant components for an e-business transaction over the Web in accordance with the present invention.

FIG. 1 is a block diagram illustrating components involved in an exemplary business transaction conducted via the World Wide Web. A user working at a client machine 14 accesses a server 16, for example, through the public telephone network 18 using a modem 20. The server 16 typically is operated by the user's Internet Service Provider (ISP). The ISP may have another modem (not shown) to interface to the user's modem 20. The ISP is coupled to the Web 12 and transfers data between the user's client machine 14 and destinations selected by the user that are accessible via the Web. The World Wide Web 12 is a collection of switches, routers and computers forming a computer network that essentially spans the globe. The general organization of the Web is well known and does not form part of the present invention and is therefore not discussed herein. Businesses such as business 20 also are connected to the Web by a Web server such as Web server 22 and maintaining a plurality of Web pages that can be accessed by others via the World Wide Web. For exemplary purposes let us assume that business 20 is a compact disc retailer that maintains its own Web server at its own physical plant and connects directly to the Web 12 without using the public telephone network.

A user running World Wide Web browser software such as Netscape Navigator or Microsoft Internet Explorer on a client machine 14 can access any page on the World Wide Web. When the user wishes to access a certain page on the Web, for example, the home page of compact disc retailer 20, the user types in the Universal Resource Locator (URL) for that page in the appropriate field of a display screen presented by the browser software or, alternately, clicks on a hyperlink in another Web page that is currently being viewed that directs the browser software to the home page of business 20. The browser software sends a request for that URL to the ISP's server 16. The ISP's server 16 converts the URL into an alpha-numeric address and sends the request out on the Web 12 to the particular server 22 identified by the alpha-numeric address. In response to the request received from the user's browser software via the user's client machine 14, the ISP's server 16 and the Web 12, the retailer's server 22 returns a HTML (Hypertext Markup Language) page to be displayed on the user's computer terminal. A home page typically does not require the user to input any information.

The home page typically comprises graphics and text and one or more hyperlinks to other Web pages on the retailer's server 22. At least some of the Web pages referenced by hyperlinks on the home page typically will be pages in which the user can enter information to be sent to the retailer 20 necessary for purchasing a compact disc (hereinafter input information). When a user clicks his mouse on one of these hyperlinks (which is essentially a shorthand method of requesting another URL), the newly selected Web page is returned to the user via the same type of processing described above with respect to accessing the home page. In short, the request is received at the retailer's server 22 and the retailer's server returns a page in which the user can enter certain information needed in order to purchase a compact disk. Typically this page will include various fields in which the user must enter the appropriate information (name, address, desired compact disc, credit card number and expiration date, etc.). After the user enters all of the requested input data, the user clicks his mouse on a certain button (e.g., a send button) which causes the browser software to forward the input information back to the retailer's server 22.

The retailer's server is also coupled to a retailer's back-end computer on which the retailer's business software runs. For example, the back-end computer may be a mainframe computer 24 at the retailer's business location.

In the prior art, the user interface and the business processing programming were intertwined and ran on the retailer's Web application server. In the prior art, the Web server might access a database maintained on a separate, back-end, mainframe. However, the actual processing of the data obtained from the database was performed at the server in a programming environment in which the user interface, input data verification, business processing to generate output data, and formatting of the output data were intertwined in the same software (e.g., by a CGI application program or ASP program).

In accordance with the present invention, all of the business processing can remain in a back-end computer while all of the user interface programming (Web programming) is performed at the Web server, for example, by a Java Server Page. Further, all of the other processing of the input and output data that is neither user interface processing or business processing can be performed by one or more other independent programs, such as one or more Java beans. Such other processing may include formatting of output data, validation of data, and cross-verification of multiple interdependent fields of input data. All of these various programs interface to each other via a very simple gateway servlet program, that performs almost no processing of data other than receiving and transmitting data between the various browsers, Java beans, Java Server Pages, and business processing programs.

In this manner, the Web software developers and the business software developers can operate essentially independently of each other, thus allowing each developer to most efficiently use his or her skills without the need to worry about the other. In addition, with respect to existing businesses that already have highly developed and reliable business software, such a business does not need to develop new business software in order to transact business via the Web. Instead, it can simply use its existing well-established business software and separately develop user interface software for the Web.

While the examples discussed herein relate to situations in which the business software is resident on a separate, back-end computer, e.g., a mainframe, the business processing software could just as easily run on the Web server itself. It is the logical separation of the business processing software, Web user-interface software, data formatting software, input data validation, and other software more than the location at which they run that provides the primary advantages of the present invention.

Reference is now made to FIG. 2 which is a flow diagram illustrating the interaction between the user's browser software running on the client machine 14, various programs running on the retailer's server 22, and various programs running on the retailer's mainframe 24. In order not to obfuscate the invention, the ISP's server 16 and the Web 12 are not illustrated in FIG. 2. The details of those interactions are well known and do not form part of the present invention. Tower 202 represents the browser software running at the user's client machine 14. Towers 204, 206 and 208 represent software running at the retailer's Web server 22. Tower 204 represents a particular Java servlet in accordance with the present invention, herein termed a gateway servlet and described in more detail below. Tower 206 represents one or more beans resident on the retailer's Web server. Tower 208 represents one or more Java server pages (JSP) programs for generating HTML pages and also is resident on the retailer's server. Tower 210 represents the retailer's business software and comprises one or more application programs which, for example, may be running on the back-end mainframe 24.

In step 222, responsive to the user typing the appropriate URL (or clicking on a hyperlink), the user's browser links to the gateway servlet 204 running on the retailer's Web server 22. In step 224, the gateway servlet serves the retailer's home page back to the browser. In step 226, the user selects a hyperlink in the home page to obtain a page in which he can enter his order and other relevant information, such as name, address; e-mail address, requested compact disc(s), credit card number, credit card expiration date, requested shipping method, shipping address, etc.

In step 228, the gateway servlet 204 serves that page back to the user's browser for display at his terminal by his browser. In step 230, the user fills in the requested information in various fields. The user then clicks on a send button in the page which results in the browser sending the entered information back to the gateway servlet 204 at the retailer's Web application server (step 232). As in the prior art, the send button essentially is a disguised hyperlink identifying a specific URL. However, in accordance with the invention, that URL additionally includes the identity of the program or programs in the back-end 24 that need to be run in order to process the data.

The gateway servlet 204 receives the information entered in the data fields by the user (hereinafter input data). In step 232, the gateway servlet instantiates a bean designed to process the input data as needed. In step 236, the gateway populates the bean with the input data. As is well known in the art of Web software development, Java is an object oriented programming language in which a Java bean is a small program that is a class, i.e., a set of attributes (data) and a set of methods (what to do with the data). When another program, such as the gateway servlet, populates a particular bean with data, a new instance of that bean is created. Each instance of that bean has different data (attributes) but the same processes (methods).

In accordance with the invention, the beans do not perform business processing. However, they preferably perform all other processing of the input data. This might include checking if the proper number and/or type of characters have been entered in any field in which the number of characters must meet certain limitations. For instance, credit card numbers must have 16 digits and they must all be numbers; a name must be comprised entirely of alphabetical characters; dates must be entered in a certain format; e-mail addresses must be of a certain format; a U.S. zip code must have 5 or nine numeric digits; etc. Further, some fields may be interdependent. The consistency of the data in such fields can be verified by the bean.

In step 238, the selected bean runs. After running, in step 240, the bean returns a PASS or FAIL indication to the gateway servlet. If it returns a FAIL, the gateway servlet must send the same page back to the user preferably including an indication of the fact that there is an error in the input data that must be corrected and identifying the nature of the error and the field(s) in which it occurred so that the user can correctly enter the data and resubmit the page. For purposes of simplifying FIG. 2, we shall assume that the input data is correct and, therefore, the bean returns a PASS in step 240.

The input data entered by the user now must be processed for business purposes in order to, for instance, verify the credit card number and availability of adequate credit, determine whether the retailer has the requested CD in stock, create a purchase order, notify the appropriate personnel, generate the output data that must be returned to the user, such as total cost and shipment data.

In step 242, responsive to receipt of the request from the browser, the gateway servlet 204 creates a request object. The request object specifies what program or programs must be run on the back-end to process the data. In step 244, the gateway servlet 204 sends the input data entered by the user to the back-end server along with the identity of the program or programs that must be run to process that data.

In step 246, the back-end server runs the necessary program(s). In step 248, the back-end mainframe then populates a data structure which we call a user interface (UI) record with the output data that is to be returned to the user. The populating of the UI record can be performed by a separate program running on the back end. Alternately, it may be included within the business application program. In an object-oriented programming language, the UI record is an object.

The UI record is the model for the Web page that is to be returned to the user. That is, it is a high level object defining data and the behavior associated with that data, but not the layout or appearance of that data. If the back-end software is written in the COBOL language, for example, then the UI record may be a COBOL record.

In the example that we have been using, the UI record may contain, for instance, the SKU for the desired compact disc, the full name of the artist and the title of the CD, a list of songs on the CD, the price of the CD, an indication of approval or rejection of the credit card, the total cost, possibly follow-up questions which the user may need to answer, etc.

Since the back-end has no interaction with the user interface other than populating the UI record, the back-end software requires almost no redesign. The UI record contains the data which is to be returned to the user's browser and specifies what should happen to it, but contains no information at all about how it is to be presented to the user. Further, it preferably contains no information about how it is to be formatted. Although, in alternate embodiments, data formatting can be performed in the back-end.

The data generated at the back-end that is contained in the UI record now must be inserted into a Web-based user interface. Accordingly, at least some of the information contained in the UI record concerning what should happen to the data identifies a bean and a Java Server Page (JSP) that are to be used to build a Web page for presenting the data to the user.

In step 250, the back-end computer returns the populated UI record to the gateway servlet.

In step 252, the gateway instantiates the identified bean (hereinafter termed UI bean). In step 254, it populates that UI bean with the data from the UI record.

In step 258, the gateway servlet 204 invokes the identified Java Server Page. The Java Server Page completely defines how the data will be laid out in a Web page to be presented to the user. Accordingly, in step 260, the JSP accesses the bean to obtain the data that is to be incorporated into the Web page as designed by the JSP. As is well known in the art of Web software development, a JSP basically comprises Java code with HTML code throughout it. When the Java code runs, it issues all of the HTML code inside of it to create a Web page. The Java Server Page completely defines how the data will be laid out in a Web page to be presented to the user. Finally, in step 262, the JSP returns a Web page to the browser which contains all of the data defined by the UI record and laid out for presentation to the user in the manner defined by the JSP.

The bean that is instantiated and populated in steps 252 and 254 may be the same bean instantiated in step 234 or a different one. In a preferred embodiment of the invention, in addition to providing the output data for the Web page created by the JSP in steps 258 and 260, it performs all necessary processing of the output business data other than creating the user interface (Web page).

For instance, this may comprise all formatting of the data, such as taking a raw value for the cost of the compact disc and formatting it with a dollar sign ($) and a decimal point between the dollars and cents portions of the price or taking a numeric data code and formatting it as "Jan. 11, 2000".

The bean defines a set of methods that manipulates the business data and returns META information about the business data, but does not include any intelligence about how the data will be presented to the user. Examples of manipulation methods are methods that format numeric data into defined currencies as discussed immediately above, or that validate user input, as discussed in connection with steps 238–240. Examples of META information methods are methods that return labels or HELP text associated with a given field.

Error messages associated with a given field that had user input FAIL as described above in connection with steps 238–240 is one example of META information that has been created during run time.

In essence, the Bean encapsulates all the relevant information about the business data that is to be put on the Web page but says nothing about how or where or in what form the data will be displayed on that Web page.

Thus, it can be seen that, in accordance with the present invention, the business processing software is entirely separated from the Web presentation (or user interface) software, which is entirely separated from the input data verification programming and the output data formatting programming. The only interaction between the various software components is through the UI record which the back-end returns to the gateway and which the gateway uses to populate a Java bean.

It should be understood by those of skill in the art that in accordance with the present invention, for each different Web page that can be returned to a user, there would typically be a different JSP and related bean. Further, beans have persistence, i.e., they store the state of a component. This allows, for example, a component (bean) to remember data that a particular has already entered in an earlier user's session.

Thus, a method and apparatus has been presented that allows for separation of business processing programming, Web user-interface programming, input data verification programming, and output data formatting programming in the development of e-business software. All of these software components are enabled to interface with each other through the use of a very simple gateway servlet. This allows existing businesses to expand more easily into e-business since existing business software does not need to be substantially redesigned to convert to e-business application. Further, it makes it easier for any business to develop e-business software since the business processing software development can be done separately from the Web/user-interface software development. Thus, a software developer who is well-versed in a 3GL or 4GL business programming language but has little knowledge of Web application programming languages such as HTML and Java, is not precluded from developing software for Web driven applications.

While the particular embodiments of the invention discussed above all relate to the conduct of a business transaction between a buyer and a seller via the World Wide Web, the invention has much broader application. For instance, it can be used in any data transfer, i.e., request/response data exchange between two programs, and is not necessarily limited to buyer/seller business transactions. Further, the invention is applicable to any computing environment and is not necessarily limited to the World Wide Web or even network environments.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. For example, the embodiments discussed above are particularly related to the Java programming language and are exemplary in nature. It should be understood by those of skill in the related arts that the invention can be applied within the framework of other object oriented programming languages. Accordingly, the foregoing description is by way of example only, and not limiting. The invention is limited only as defined in the following claims and equivalents thereto.

I claim:

1. A method for transacting business via a network, said method comprising the steps of:

(1) generating at a client machine a request comprising a first data set for use in conducting a business transaction via said network;

(2) transmitting said request via said network to an interface program running on a network server;

(3) said interface program extracting said first data set from said request and transmitting said first data set to a second program that is to be run in order to process said first data set;

(4) running said second program to process said first data set to generate a second data set therefrom;

(5) said second program populating a record with said second data set;

(6) transmitting said record from said second program to said interface program;

(7) said interface program causing the creation of a user interface at said network server populated with said second data set; and (8) transmitting said user interface via said network to said client machine for display.

2. The method of claim 1 wherein said interface program comprises a Java servlet.

3. The method of claim 2 wherein said network is the World Wide Web.

4. The method of claim 2 wherein step (2) comprises sending a Universal Resource Locator with said first data set, said Universal Resource Locator containing an identity of said second program.

5. The method of claim 4 wherein said program is a COBOL program and said record is a COBOL record.

6. The method of claim 4 wherein said second program is resident on a separate computer from said network server.

7. The method of claim 1 wherein step (3) comprises the steps of:

(3.1) said interface program instantiating a first Java bean for said first data set;

(3.2) said interface program populating said first Java bean with said first data set; and (3.3) said first Java bean operating on said first data set.

8. The method of claim 1 wherein step (7) comprises the steps of:

(7.1) said interface program instantiating a second Java bean for said second data set;

(7.2) said interface program populating said second Java bean with said second data set;

(7.3) said second Java bean manipulating said second data set to generate meta information corresponding to said second data set;

(7.4) said controller program Invoking a Java Server Page corresponding to said second Java bean; and (7.5) said Java Server Page calling said second Java bean and using data from said second Java bean to create a Web page to be transmitted to said client machine.

9. The method of claim 8 wherein step (8) is performed by said Java Server Page.

10. The method of claim 7 wherein step (7) comprises the steps of:

(7.1) said interface program instantiating a second Java bean for said second data set;

(7.2) said Interface program populating said second Java bean with said second data set;

(7.3) said second Java bean manipulating said second data set to generate meta information corresponding to said second data set;

(7.4) said controller program invoking a second Java Server Page corresponding to said second Java bean; and (7.5) said Java Server Page calling said second Java bean and using data from said second Java bean to create a Web page to be transmitted to said client machine.

11. The method of claim 10 wherein said interface program is a Java servlet.

12. The method of claim 10 wherein said first and second Java beans are the same Java bean.

13. The method of claim 7 wherein step (5) further comprises populating said record with the identity of the Java Server Page and Java bean to which said record pertains.

14. A method of processing data for purposes of a business transaction via the World Wide Web, said method comprising the steps of;

(1) receiving at an interface program running on a network server from a client machine via said World Wide Web a request comprising a first data set to be processed in connection with a business transaction;

(2) said interface program extracting said first data set from said request and transmitting said first data set from said network server to a back-end computer along with an identity of a program resident on said back-end computer which is to be run in order to process said first data set;

(3) said interface program receiving from said back-end computer a record defining a second data set derived by said back-end computer from said first data set;

(4) said interface program causing the creation of a user interface at said server populated with said second data set; and (5) transmitting said populated user interface via said network to said client machine for display.

15. The method of claim 14 further comprising the step of:

(6) prior to step (1), transmitting to said client machine a first Web page including (a) at least one field within which a user at said client machine is to insert said first data set, and (b) a hyperlink identifying a Universal Resource Locator that includes an identity of said program to be run on said back-end computer to generate said second data set.

16. The method of claim 15 wherein said interface program comprises a Java servlet.

17. The method of claim 16 wherein step (4) comprises the steps of:

(4.1) said servlet instantiating a Java bean for said second data set;

(4.2) said servlet populating said Java bean for said second data set with said second data set;

(4.3) said Java bean for said second data set manipulating said second data set to generate meta information corresponding to said second data set;

(4.4) said servlet invoking a Java Server Page corresponding to said Java bean for said second data set; and (4.5) said Java Server Page calling said Java bean for said second data set and using data from said Java bean to create a Web page to be transmitted to said client machine.

18. The method of claim 17 wherein step (5) is performed by said Java Server Page.

19. The method of claim 18 wherein step (2) comprises the steps of:

(2.1) said servlet instantiating a Java bean for said first data set;

(2.2) said servlet populating said Java bean for said first data set with said first data set; and (2.3) said Java bean for said first data set operating on said first data set.

20. The method of claim 19 wherein said Java bean for said first data set and said Java bean for said second data set are the same Java bean.

21. The method of claim 20 wherein step (3) comprises receiving along with said record the identities of said Java Server Page and said second Java bean to which said record pertains.

22. A programmable computer for processing data for purposes of a business transaction via the World Wide Web, programmable computer having a recordable medium comprising:

a first program for receiving from a client machine via said World Wide Web a request comprising a first data set to be processed in connection with a business transaction, for extracting said first data set from said request and transferring said first data set to a second program which is to be run in order to process said first data set, and for receiving from said second program a record defining a second data set derived by said second program from said first data set, and for transferring said second data set to a third program; and said third program for creating a user interface and populating it wit said second data set and for transmitting said populated user interface via said network to said client machine for display.

23. The programmable computer of claim 22 wherein said first program comprises a Java servlet.

24. The programmable computer of claim 22 wherein said first program further transmits to said client machine prior to receiving said first data set a first Web page including at least one field within which a user at said client machine is to insert said first data set and a hyperlink identifying a Universal Resource Locator that includes an identity of said second program.

25. The programmable computer of claim 24 wherein said third program comprises at least one Java bean and at least one Java Server Page corresponding to said second program and wherein said first program comprises:

means for instantiating said Java bean;

means for inserting said second data set into said Java bean;

means for invoking said Java Server Page corresponding to said Java bean; and means for causing said Java Server Page to call said Java bean and use data of said Java bean to create a Web page to be transmitted to said client machine.

26. The programmable computer of claim 23 wherein said second program comprises;
- means for processing said first data set to generate said second data set therefrom;
- means for populating said record with said second data set; and
- means for transferring said record to said first program.

27. The programmable computer of claim 26 wherein said second program is a COBOL program and said record is a COBOL record.

28. A computer readable product embodied on computer readable media readable by a computing device for conducting a business transaction via the World Wide Web, said product comprising computer executable instructions for:
- receiving from a client machine via said World Wide Web a request comprising a first data set to be processed in connection with a business transaction;
- extracting said first data set from said request and transmitting said first data set to a second program that is to be run in order to process said first data set;
- receiving from said second program a record defining a second data set derived by said back-end computer from said first data set;
- causing the creation of a user interface at said network server populated with said second data set; and
- transmitting said user interface via said network to said client machine for display.

29. The computer readable product of claim 28 wherein said computer executable instructions for extracting comprises computer executable instructions for:
- instantiating a first Java bean for said first data set; and
- populating said first Java bean with said first data set, said first Java bean operating on said first data set.

30. The computer readable product of claim 28 wherein said computer executable instructions for causing the creation of a user interface comprises computer executable instructions:
- instantiating a second Java bean for said second data set;
- populating said second Java bean with said second data set, said second Java bean manipulating said second data set to generate meta information corresponding to said second data set;
- invoking a second Java Server Page corresponding to said second Java bean, said Java Server Page calling said second Java bean and using data from said second Java bean to create a Web page to be transmitted to said client machine, and said second Java Server Page transmitting said user interface via said network to said client machine for display.

31. The computer readable product of claim 29 wherein said computer readable product comprises a Java servlet.

32. The computer readable product of claim 31 further comprising computer executable instructions for:
- transmitting to said client machine a first Web page including at least one field within which a user at said client machine is to insert said first data set, and a hyperlink identifying a Universal Resource Locator that includes an identity of said business processing program.

33. The computer readable product of claim 32 wherein said record defining said second data set further includes the identity of said second Java Server Page and said second Java bean, said computer readable product further comprising computer executable instructions for determining said second Java Server Page and said second Java bean from said record.

34. A method for transferring data between first and second programs comprising the steps of:
- (1) generating in a first program a first data set intended to be processed by a second program;
- (2) transferring said first data set to a Java servlet program;
- (3) said Java servlet program extracting said first data set from said data and transferring said first data set from said Java servlet program to said second program;
- (4) running said second program to process said first data set to generate a second data set therefrom;
- (5) populating a record with said second data set;
- (6) transferring said record to said Java servlet program;
- (7) instantiating a Java bean for said second data set;
- (8) inserting said second data set into said Java bean;
- (9) invoking a Java Server Page corresponding to said Java bean; and
- (10) said Java Server Page calling said Java bean and using data from said Java bean to create a Web page to be transmitted to said client machine; and
- (11) transmitting said user interface via said network to said client machine for display.

35. The method of claim 34 wherein step (5) further comprises populating said record with the identity of the Java Server Page and Java bean to which said record pertains.

* * * * *